United States Patent [19]

Cheetam et al.

[11] Patent Number: 5,720,017
[45] Date of Patent: Feb. 17, 1998

[54] SYSTEM AND METHOD FOR FORMULATING A COLOR MATCH USING COLOR KEYS

[75] Inventors: William Estel Cheetam, Clifton Park, N.Y.; John Frederick Graf, Vienna, W. Va.

[73] Assignee: General Electric Company, Schenectady, N.Y.

[21] Appl. No.: 550,059

[22] Filed: Oct. 30, 1995

[51] Int. Cl.$^6$ .................................................. G06F 15/00
[52] U.S. Cl. .................................................. 395/131
[58] Field of Search .......................... 395/131; 358/518, 358/523; 356/402, 243; 345/199, 150

[56] References Cited

U.S. PATENT DOCUMENTS

| | | | |
|---|---|---|---|
| 4,721,951 | 1/1988 | Holler | 345/154 |
| 4,887,906 | 12/1989 | Koehler | 356/402 |
| 5,296,947 | 3/1994 | Bowers | 358/527 |
| 5,590,251 | 12/1996 | Takagi | 395/13 |

OTHER PUBLICATIONS

US Patent Application "A Method and System for Formulating a Color Match" by William E. Cheetham, et al, Attorney Docket RD–24,621 Filed Sep. 29, 1995.

*Primary Examiner*—Phu K. Nguyen
*Attorney, Agent, or Firm*—David C. Goldman; Marvin Snyder

[57] ABSTRACT

A method and system create a color match that reproduces a color standard. First, the color spectrum of a color standard is read. After reading the color spectrum, a plurality of formula keys corresponding to the color spectrum of the color standard are obtained. Each of the plurality of formula keys have a different combination of colorants that formulate the color standard. The plurality of formula keys are restricted to combinations that have a greater probability of generating a color match with the color standard. Each of the plurality of formula keys are then evaluated in order of probability of generating a color match with the color standard to determine whether the colorants in each formula key can be combined to reproduce the color standard. The formula keys having a greater probability of generating a color match are evaluated prior to formula keys having a lesser probability of generating a color match. Each evaluation generates a degree of match between each formula key and the color standard. The degrees of match generated from all of the plurality of formula keys are then compared to determine the best match with the color standard. The formula key having the best match is then used to reproduce the standard color.

6 Claims, 3 Drawing Sheets

SYSTEM AND METHOD FOR FORMULATING A COLOR MATCH USING COLOR KEYS

BACKGROUND OF THE INVENTION

The present invention relates generally to color formulation development and more particularly to reducing the time in selecting the optimum colorants for reproducing a color standard.

In color formulation development, a standard is the color sample to be matched. A color standard is usually reproduced by selecting a set of colorants and loadings that produce the color under all lighting conditions. Typically, the selection of colorants for reproducing a color standard has been accomplished by using accumulated working experience. In this approach, a color formula specialist uses their knowledge and experience to select the combination of colorants for reproducing the color standard. However, this approach is not easily implemented by less experienced specialists. In addition, the accumulated working experience approach suffers from the inability to evaluate a large number of alternative colorant combinations and unwarranted human biases towards particular colorants. Thus, any colorants that are selected in this manner would probably not be able to optimally produce the color standard.

Some of the disadvantages of the accumulated working experience approach have been avoided by using a computer to perform a search of possible colorant combinations. In this approach, a set of colorants that could produce a color formula for reproducing the color standard are initially selected. The set may include all or some of the colorants available to produce the color formula. Next, a restriction on the number of colorants to be used in the color formula is specified. The restriction is usually in the form of an absolute number or as an upper or lower limit (e.g. values ranging from four to seven colorants). After the restriction has been set, the computer search is executed so that every combination of colorants in the selected set is tried while obeying the specified restriction. Trying every combination of colorants requires $N!/((N-M)!M!)$ colorant combination computation cycles, wherein N is the selected number of colorants in the set and M is the specified restricted absolute number of colorants to be used in the formula. The colorant combination computation cycle calculates how well the colorant combination reproduces the color standard, while meeting property and appearance specifications for the application of the standard. Table 1 shows the number of computation cycles for typical values of N and M and the computational time assuming a typical value of 0.1 seconds per colorant combination computation cycle. Table 1 indicates that for a set containing 60 different colorants, it would a take a computer 13.5 hours and 57.9 days to evaluate how well each combination compares to the standard, for a restriction of M equal to 4 and 6, respectively.

TABLE 1

| N= | #Combinations | M=4 Computational Time | M=625 #Combinations | Computational Time |
|---|---|---|---|---|
| 20 | 4,845 | 8.1 minutes | 38,760 | 1.1 hours |
| 40 | 91,390 | 2.5 hours | 3,838,380 | 4.4 days |
| 60 | 487,635 | 13.5 hours | 50,063,860 | 57.9 days |

The majority of these colorant combinations represent unusable or sub-optimal formulas. To obtain a color formula within a reasonable amount of time, the computer search has to be limited to a small set of colorants (i.e., less than 20), while the typical number of colorants available to produce a color formula may range from 30 to 100 colorants. By limiting the set of colorants, N, to a smaller subset than what is available, the computer search will likely miss finding the optimum formula solution to reproduce the color standard.

SUMMARY OF THE INVENTION

Therefore, there is a need for a procedure that can quickly find the colorant combination for optimally reproducing a color standard. The present invention has fulfilled this need by significantly reducing computer search time, and more particularly, by reducing the number of colorant combinations that have to be evaluated so that only colorant combinations that have a higher probability of leading to an optimum solution are evaluated before those with a lower probability.

Thus in accordance with the present invention, there is provided a method and system for creating a color match that reproduces a color standard. The present invention includes reading the color spectrum of a standard. After reading the color spectrum, a plurality of formula keys corresponding to the color spectrum of the color standard are obtained. Each of the plurality of formula keys have a different combination of colorants that formulate the color standard. The plurality of formula keys are restricted to combinations that have a greater probability of generating a color match with the color standard. Each of the plurality of formula keys are then evaluated in order of probability of generating a color match with the color standard to determine whether the colorants in each formula key can be combined to reproduce the color standard. The formula keys having a greater probability of generating a color match are evaluated prior to formula keys having a lesser probability of generating a color match. Each evaluation generates a degree of match between each formula key and the color standard. The degree of matches generated from all of the plurality of formula keys are then compared to determine the best match with the color standard. The formula key having the best match is then used to reproduce the standard color.

While the present invention will hereinafter be described in connection with an illustrative embodiment and method of use, it will be understood that it is not intended to limit the invention to this embodiment instead, it is intended to cover all alternatives, modifications and equivalents as may be included within the spirit and scope of the present invention as defined by the appended claims.

DETAILED DESCRIPTION OF THE PRESENT INVENTION

Figure 1:
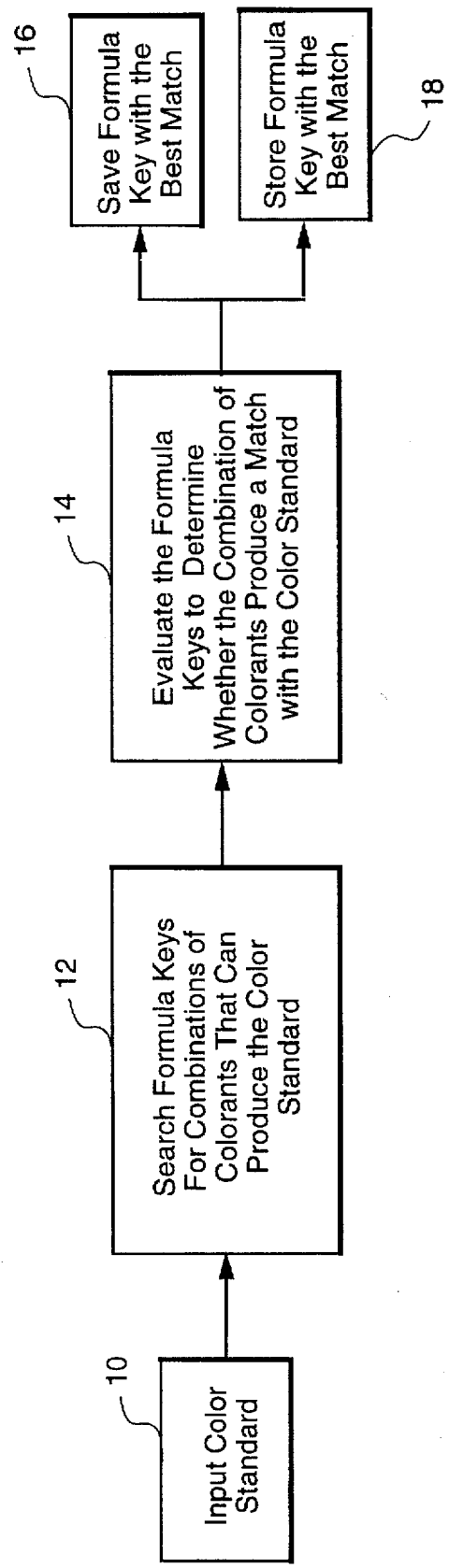
FIG. 1 is a block diagram describing a search process used in the present invention.

A block diagram describing a search process used in the present invention is shown in FIG. 1. At 10, a color standard made from a material such as plastic, paper, cloth, ceramic, or the like, having a new color is received. The standard is the color sample to be matched. Given the color, the present invention searches a database of formula keys and possible pigments at 12. The database contains a plurality of formula keys used for reproducing a specified color. Each of the plurality of formula keys for the specified color have a different combination of colorants that can formulate the colors. Each of the plurality of formula keys are restricted to combinations that have a greater probability of generating a color match with the color standard. At 14, the plurality of formula keys are evaluated in order of their probability of generating a match to determine whether the colorants in each formula key can be combined to produce the color standard. The present invention then saves the formula key having the best match to the standard at 16 and outputs that color formula at 18.

Figure 2:
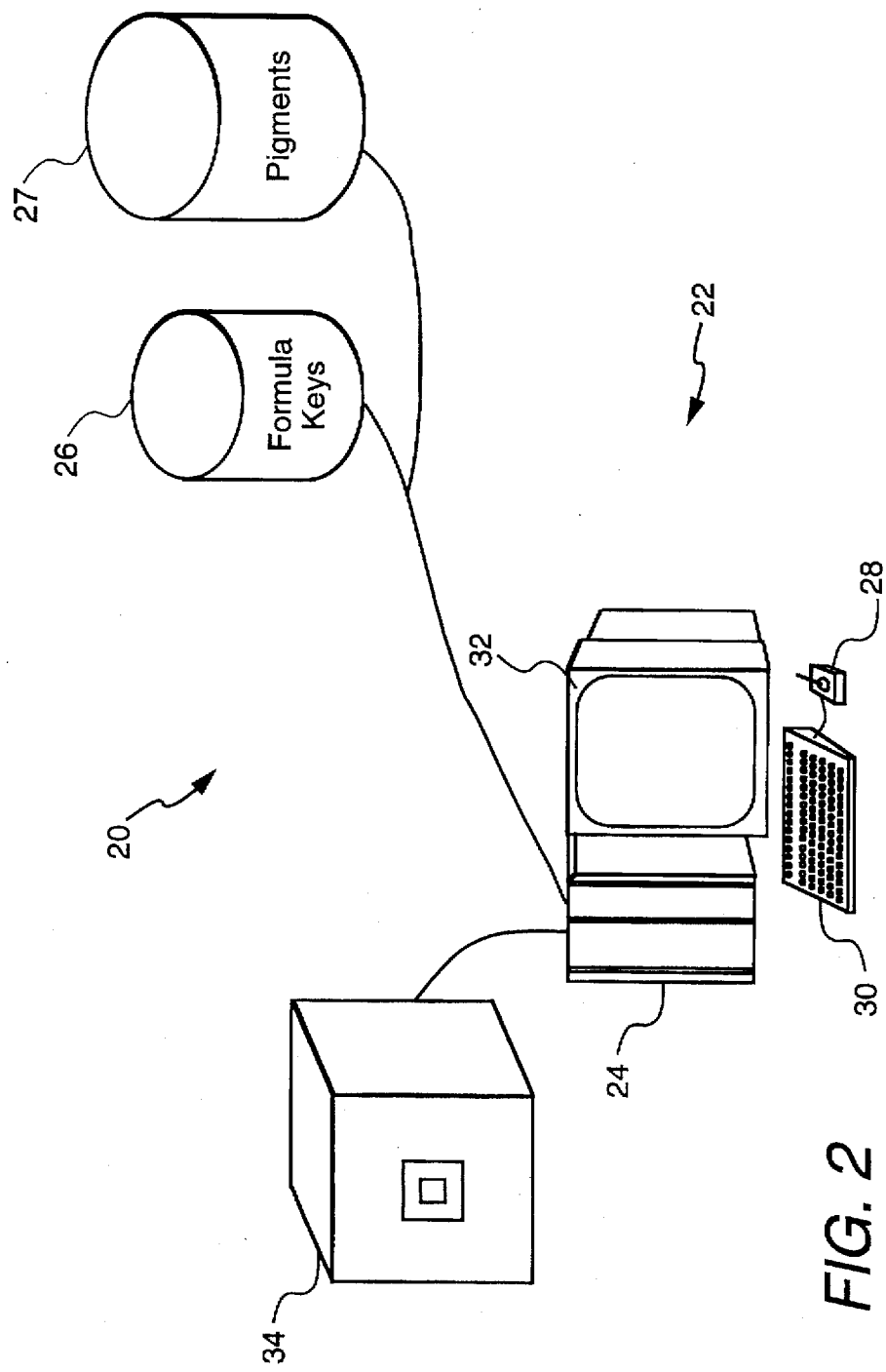
FIG. 2 is a diagram illustrating the system used in the present invention.

FIG. 2 is a diagram illustrating a system 20 used to implement the present invention. The system includes a processor 22 such as a personal computer having a 80386 processor or higher. In the preferred embodiment of the present invention, a 486 CPU 50 MHz personal computer with 8 megabytes of RAM provides the best results. The processor is run by application software embodied in a hard disk 24 such as Microsoft MS-DOS® version 3.1 operating system or later version or Microsoft Windows® operating system. A user communicates with the processor 22 and databases 26 and 27 by a mouse or other pointing device 28 and a keyboard 30. The database 26 contains the plurality of formula keys used to formulate colors such as red, blue, green, yellow, orange, gray, white, blacks, and many others. For each color, there are several keys that have been used to produce the color. For example, for the color red, there may be four different keys containing colorant combinations that could be used to produce the color red. In particular, key one ($K_1$) could comprise a white colorant, a black colorant, and a red colorant; key two ($K_2$) could comprise a white colorant, a black colorant, a red colorant, and a yellow colorant; key three ($K_3$) could comprise a white colorant, a black colorant, a red colorant, an orange colorant, and a yellow colorant; and key four ($K_4$) could comprise a white colorant, a black colorant, an orange colorant, and a yellow colorant. However, for each colorant there are several different pigments that can be used for the colorant. For example, for the colorant red, there could be three different red pigments available. In particular, the red pigments could be a fine red, a crimson, and a garnet. The different pigments that can be used for the colorants are stored in the database 27. The processor uses the formula keys and pigments to find a colorant combination that can optimally produce the color standard. The results are displayed on a display 32. Connected to the processor is a spectrophotometer 34 such as a MacBeth® 7000 or 2020 spectrophotometer for reading the color of a standard. Further discussion of the above system is provided in U.S. patent application Ser. No. 08/538,493, entitled "A Method and System for Formulating A Color Match", which is incorporated herein by reference.

Figure 3:
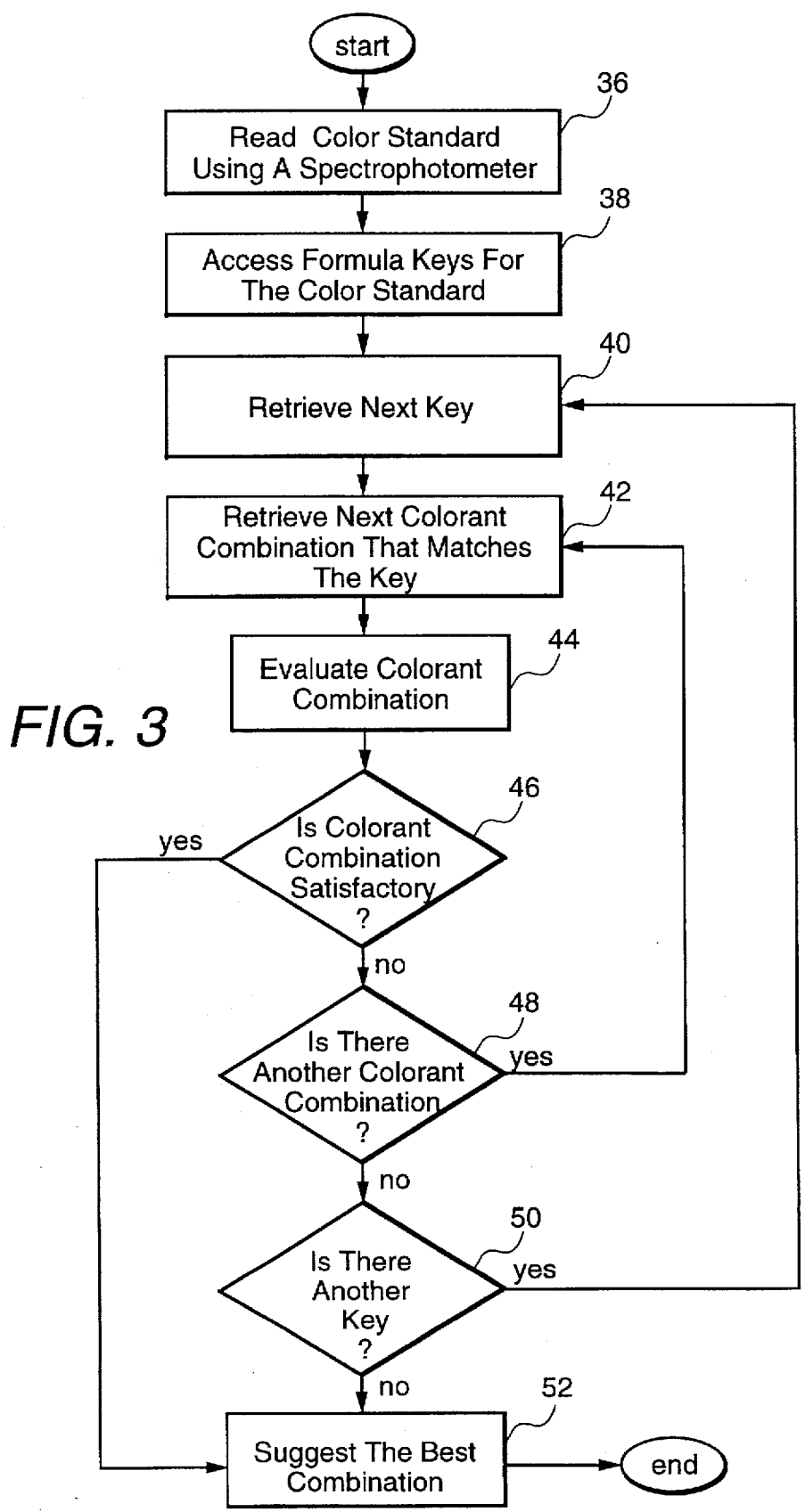
FIG. 3 is a flow chart illustrating the operation of the present invention.

FIG. 3 is a flow chart illustrating the operation of the present invention. The color reproduction process of the present invention starts at 36 where the color standard is placed in the spectrophotometer 34 and its color spectrum is then read. Next, the processor 22 accesses the plurality of formula keys corresponding to the color of the standard from the database 26 at 38. Each of the plurality of formula keys for the specified color are restricted to colorant combinations that have a greater probability of generating a color match with the color standard. In order to expedite the reproduction process, the keys that are most likely to provide a match with the color standard are accessed first at 40. For the first key having the greatest probability of generating a match, a colorant combination that satisfies the key is retrieved from the database 27 at 42. Then the retrieved colorant combination is evaluated at 44 to determine whether that combination can reproduce the color standard. The evaluation produces a value that indicates the degree of match between the particular colorant combination and the color standard. The matching value is then examined at 46 to determine if the colorant combination does satisfactorily reproduce the color. Typically, the matching value is compared to a predetermined threshold value specified by a user. If the colorant combination does satisfactorily reproduce the color standard (i.e., the matching value is greater than the threshold), then that colorant combination is outputted to the user at 52. Alternatively, if the colorant combination does not satisfactorily reproduce the color standard, then the processor checks to see if there is another colorant combination for that particular key at 48. If there is another colorant combination for that particular key, then the next colorant combination is retrieved at 42 and evaluated at 44. These steps continue until a colorant combination for that key produces a satisfactory result or until a maximum number of evaluations specified by the user has been reached. However, if none of the colorant combinations for that key results in a satisfactory combination, then the processor checks to see if there is another key that corresponds to the color standard at 50. If there is another key, then the next key is retrieved at 40. In the present invention, the next key will be the next key most like to provide a match with the color standard. Steps 42 through 48 are repeated until a color combination for that particular key is found that can satisfactorily reproduce the color standard. If none of the colorant combinations in the key can satisfactorily reproduce the color standard, then the next key and all of its possible colorant combinations are evaluated. This process continues until a key and accompanying colorant combination is found that can be used to reproduce the color standard or until a maximum number of evaluations specified by the user has been reached. Then the colorant combination from the selected key is outputted at 52.

An example illustrating the operation of how the present invention reproduces a standard having a color such as red is presented below. After the spectrophotometer 34 has read the color spectrum of the red standard, the processor 22 accesses all of the formula keys from the database that correspond to red. Typically, a single color class can have from 10 to 15 different formula keys. However, for ease of explanation, the color class for this example has only four formula keys which are shown in Table 2. Key one ($K_1$) comprises a white colorant, a black colorant, and a red colorant; key two ($K_2$) comprises a white colorant, a black colorant, a red colorant, and a yellow colorant; key three ($K_3$) comprises a white colorant, a black colorant, a red colorant, an orange colorant, and a yellow colorant; and key four ($K_4$) comprises a white colorant, a black colorant, an orange colorant, and a yellow colorant.

TABLE 2

| Formula Key | Color Keys Colorants |
| --- | --- |
| K1 | White + Black + Red |
| K2 | White + Black + Red + Yellow |
| K3 | White + Black + Red + Yellow + Orange |
| K4 | White + Black + Yellow + Orange |

These formula keys ($K_1$–$K_4$) have been restricted to colorant combinations that have a greater probability of reproducing the red standard. More specifically, the formula key $K_1$ has the greatest probability of reproducing the red standard, while formula key $K_2$ has the next greatest probability, with formula keys $K_3$ and $K_4$ following in descending order. Therefore, in order to reduce time, formula key $K_1$ is accessed and evaluated first and then formula keys $K_2$-$K_4$. In this example, there may be several different colorants for each colorant type, so formula key $K_1$ will have several different colorant combinations to be evaluated. For example, as shown in Table 3 there could be three different white pigments, two different black pigments, five different red pigments, only one orange pigment, and two different yellow pigments.

TABLE 3

| Colorant Types | |
|---|---|
| Colorant Type | #of Colorants |
| White | 3 (Ivory, Pure, Bright) |
| Black | 2 (Black2, Blueblack) |
| Red | 5 (Fine-red, Crimson, Garnet, Red4, Red5) |
| Orange | 1 (Orange) |
| Yellow | 2 (Canary, Yellow1) |

Since formula key $K_1$ comprises a white colorant, a black colorant, and a red colorant, there would be 30 (3×2×5) different possible colorant combinations that would have to be evaluated. The 30 different possible colorant combinations that satisfy $K_1$ are listed below:

| | |
|---|---|
| 1. | Ivory + Black2 + Fine-red |
| 2. | Ivory + Black2 + Crimson |
| 3. | Ivory + Black2 + Garnet |
| 4. | Ivory + Black2 + Red4 |
| 5. | Ivory + Black2 + Red5 |
| 6. | Ivory + Blue-black + Fine-Red |
| . | |
| . | |
| . | |
| 30. | Bright + Blue-black + Red5 |

The combination of different pigments are then retrieved from the database 27. The first colorant combination is retrieved and then evaluated to determine whether that combination can reproduce the red standard. If the degree of match value for the first colorant combination is greater than the predetermined threshold, then that combination is used to reproduce the red standard. Alternatively, if the colorant combination does not satisfactorily reproduce the red standard, then the processor checks the next colorant combination. This evaluation continues until a colorant combination for key $K_1$ produces a satisfactory result. However, if none of the colorant combinations for key $K_1$ results in a satisfactory combination, then the processor checks formula key $K_2$. The above steps are repeated until a color combination for key $K_2$ is found that can satisfactorily reproduce the red standard. If none of the colorant combinations in key $K_2$ can satisfactorily reproduce the red standard, then key $K_3$ and all of its possible colorant combinations are evaluated. This process continues until a key and accompanying colorant combination is found that can be used to reproduce the color standard. In this example, the present invention would be able to evaluate 162 colorant combinations (see Table 4) in formula keys $K_1$-$K_4$ in about 1.62 seconds of computation time.

TABLE 4

| Colorant Combinations | | |
|---|---|---|
| Formula Key | Colorant Type | # of Colorant Combinations |
| K1 | White + Black + Red | 30 (3 × 2 × 5) |
| K2 | White + Black + Red + Yellow | 60 (3 × 2 × 5 × 2) |
| K3 | White + Black + Red + Orange + Yellow | 60 (3 × 2 × 5 × 1 × 2) |
| K4 | White + Black + Orange + Yellow | 12 (3 × 2 × 1 × 2) |

With less colorant combinations be evaluated, the present invention will find an optimal match much faster than the conventional search methods. In particular, if the search method described above in the background section were used, it would have to evaluate about 2,287 different colorant combinations, which would take a very long time as compared to the present invention.

It is therefore apparent that there has been provided in accordance with the present invention, a method and system for formulating a color match using color keys that fully satisfy the aims and advantages and objectives hereinbefore set forth. The invention has been described with reference to several embodiments, however, it will be appreciated that variations and modifications can be effected by a person of ordinary skill in the art without departing from the scope of the invention. For example, it is possible to use the present invention for formulating color standards as described in U.S. Pat. No. 5,668,633 entitled "A Method and System for Formulating A Color Match".

We claim:

1. A computer-implemented method for creating a color match that reproduces a color standard, the method comprising the steps of:

reading a color spectrum of the color standard;

obtaining a plurality of formula keys corresponding to the color spectrum of the color standard, each of the plurality of formula keys having a different combination of colorants that formulate the color standard, the plurality of formula keys restricted to combinations having a greater probability of generating a color match with the color standard;

evaluating each of the plurality of formula keys in order of probability of generating a color match with the color standard to determine whether the colorants in each formula key can be combined to reproduce the color standard, the formula keys having a greater probability of generating a color match evaluated prior to formula keys having a lesser probability of generating a color match;

generating a degree of match between each formula key and the color standard;

comparing the degrees of match generated from all of the plurality of formula keys to determine the best match with the color standard; and using the formula key having the best match to reproduce the standard color.

2. A method according to claim 1, wherein the plurality of formula keys are sorted and ranked in decreasing probability of generating a color match with the color standard.

3. A method according to claim 1, wherein each of the plurality of formula keys are obtained from historical formula data.

4. A system for creating a color match that reproduces a color standard, the system comprising:

a spectrophotometer for reading the color spectrum of the standard;

a plurality of formula keys corresponding to the color spectrum of the color standard, each of the plurality of formula keys having a different combination of colorants that formulate the color standard, the plurality of formula keys restricted to combinations having a greater probability of generating a color match with the color standard; and a processor for formulating a color match between the color spectrum of the color standard and at least one of the plurality of formula keys, the processor including means for evaluating each of the plurality of formula keys in order of probability of generating a color match with the color standard to determine whether the colorants in each formula key can be combined to reproduce the color standard, the formula keys having a greater probability of generating a color match evaluated prior to formula keys having a lesser probability of generating a color match, means for generating a degree of match value between each formula key and the color standard, means for comparing the degree of match values generated from all of the plurality of formula keys to determine the best match with the color standard; and means for using the formula key having the best match to reproduce the standard color.

5. A system according to claim 4, wherein the plurality of formula keys are sorted and ranked in decreasing probability of generating a color match with the color standard.

6. A system according to claim 4, wherein each of the plurality of formula keys are obtained from historical formula data.

* * * * *

UNITED STATES PATENT AND TRADEMARK OFFICE
CERTIFICATE OF CORRECTION

PATENT NO. : 5,720,017
DATED : February 17, 1998
INVENTOR(S) : William Estel Cheetham et al It is certified that error appears in the above-identified patent and that said Letters Patent is hereby corrected as shown below:

On the title page, item [19] should read --Cheetham-- and item [75] the first inventor's last name should read --Cheetham--.

Signed and Sealed this

Thirtieth Day of June, 1998

Attest:

BRUCE LEHMAN

Attesting Officer

Commissioner of Patents and Trademarks